United States Statutory Invention Registration [19]

Sargent et al.

[11] Reg. Number: H408

[43] Published: Jan. 5, 1988

[54] GRAPHITE CHAMBER MANUFACTURING PROCESS

[75] Inventors: Steven J. Sargent; Anthony L. Stephenson, both of Salt Lake City, Utah

[73] Assignee: The United States of America as represented by the Secretary of the Navy, Washington, D.C.

[21] Appl. No.: 856,261

[22] Filed: Apr. 28, 1986

[51] Int. Cl.[4] ..... B31C 13/00

[52] U.S. Cl. ..... 156/172

[58] Field of Search ..... 156/169, 172, 173, 175, 156/425; 60/200.1; 220/1 B, 3, 83; 428/35, 36; 242/7.02, 7.21

[56] References Cited

U.S. PATENT DOCUMENTS

| | | | |
|---|---|---|---|
| 3,047,191 | 7/1962 | Young | 156/173 X |
| 3,303,079 | 2/1967 | Carter | 156/173 X |
| 4,053,081 | 10/1977 | Minke | 156/175 X |
| 4,109,581 | 8/1978 | Six | 102/92.1 |
| 4,150,540 | 4/1979 | Krayenbuhl | 60/200 A |
| 4,280,408 | 7/1981 | Weber et al. | 102/92.1 |
| 4,348,957 | 9/1982 | White et al. | 102/377 |
| 4,384,454 | 5/1983 | Engl | 60/271 |
| 4,434,614 | 3/1984 | Gill et al. | 60/271 |

OTHER PUBLICATIONS

Rosato, D. V. and C. S. Grove, Jr., "Filament Winding: Its Development, Manufacture, Applications, and Design", 1964, Interscience Publ. (New York), pp. 148, 195, 199.

*Primary Examiner*—John F. Terapane
*Assistant Examiner*—J. E. Thomas
*Attorney, Agent, or Firm*—R. F. Beers; C. D. B. Curry; S. G. Precivale

[57] ABSTRACT

A method for manufacturing a filament wound chamber combining circular and helical winging configurations.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GRAPHITE CHAMBER MANUFACTURING PROCESS

BACKGROUND OF THE INVENTION

1. Field of the Invention

This invention relates to rocket motor chambers. More particularly, this invention relates to a method for manufacturing rocket motor chambers. Still more particularly, but without limitation thereto, this invention relates to a process for manufacturing graphite chambers.

2. Description of the Prior Art

Various techniques have been attempted in the prior art to develop a chamber which balanced the need for maximum strength and minimum weight. An example of one such measure is the utilization of graphite-epoxy composite materials.

Recent studies indicate that the pattern of winding composite materials has an effect upon the strength of the chamber. This invention utilizes a winding pattern which improves strength and in doing so, eliminates the need for reinforcement wafers, thereby minimizing the overall weight of the chamber.

SUMMARY OF THE INVENTION

An object of the present invention is to develop a rocket motor chamber which is lightweight and strong.

A further object of the present invention is to develop a chamber pressure vessel with sufficient strength so as to eliminate the need for reinforcement wafers, which will thereby reduce the chamber's overall weight and the risk of voids.

These and other objects have been demonstrated by the present invention wherein a chamber pressure vessel is formed over internal insulation by wrapping with graphite-epoxy composite material in such a manner so as to incorporate both circular and helical configurations in the winding pattern.

BRIEF DESCRIPTION OF THE DRAWING

The invention will be described in further detail with reference to the accompanying drawings wherein.

DESCRIPTION OF THE PREFERRED EMBODIMENT

Figure 1:
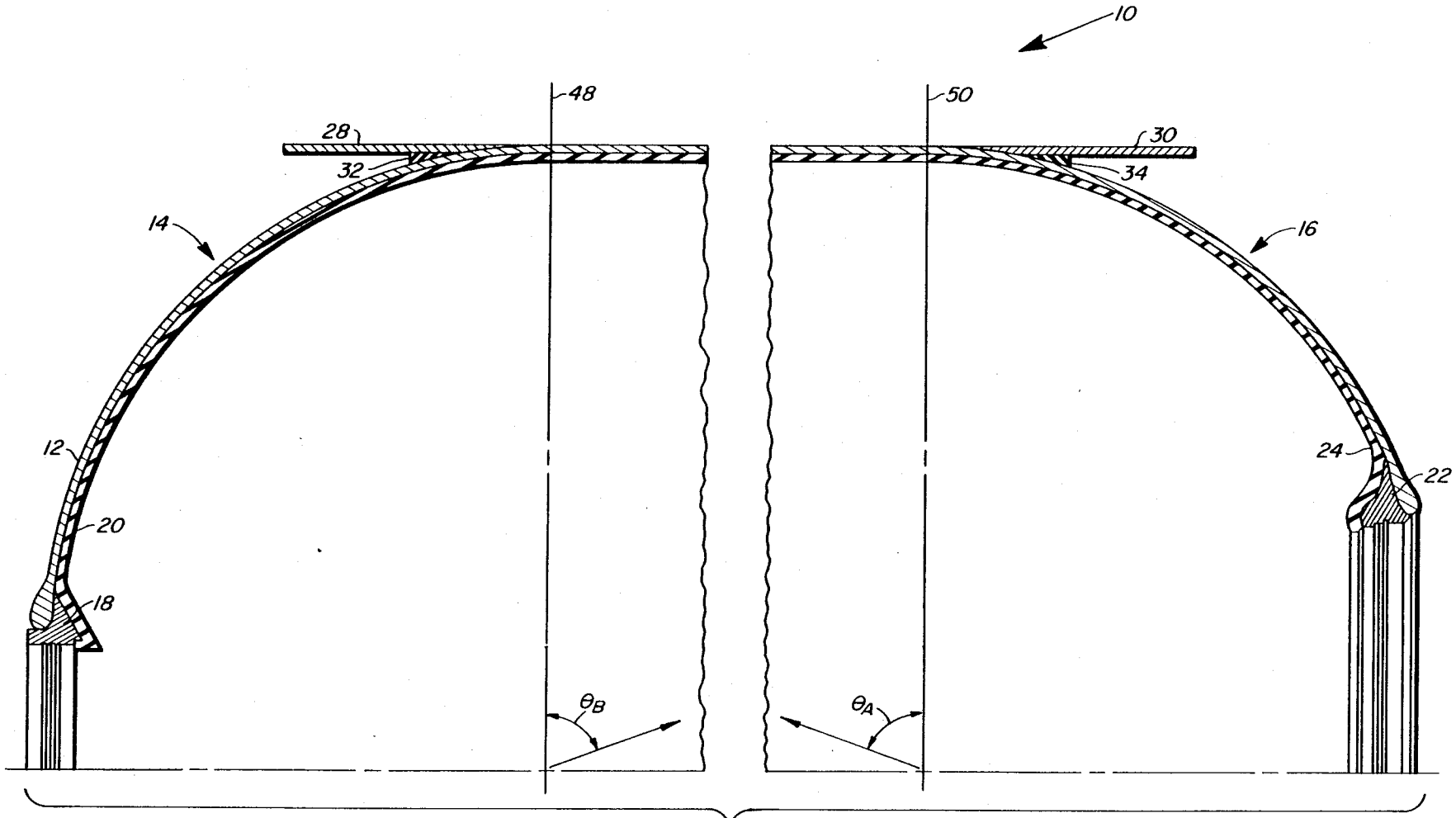
FIG. 1 is a cross sectional view of the rocket chamber taken along the longitudinal axis.

FIG. 1 illustrates the assembled filament wound chamber 10, having a pressure vessel 12, a forward end 14 and an aft end 16.

Figure 2:
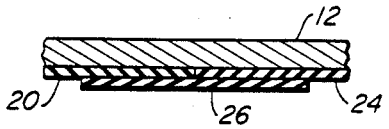
FIG. 2 is an enlarged detail view of the junction between the aft and the forward ends of the chamber.

The forward end 14 consists mainly of a forward bearing ring 18 and a forward insulator 20, which is bonded to the internal surface of the pressure vessel 12. The aft end 16 consists of an aft bearing ring 22 and an aft insulator 24 which, as the forward insulator, is also bonded to the internal surface of the pressure vessel 12. FIG. 2 illustrates the junction where the forward insulator 20 and the aft insulator 24 meet. The junction is reinforced by a splice strip 26.

FIG. 1 further illustrates the forward skirt 28 and the aft skirt 30. A portion of the area where the skirts 28 and 30 and the pressure vessel 12 meet, is filled in by means of a forward Y-joint filler 32 and an aft Y-joint filler 34. The Y-joint fillers are preferably of a rubber such as styrene butadiene.

The invention is a method of winding the pressure vessel 12. This process begins with the assembly of a net metal mandrel, not shown, which defines the internal cavity into which the propellant grain is eventually loaded. Upon the net mandrel is placed the forward 20 and aft 24 insulators, which are respectively attached to the forward 18 and aft 22 bearing rings. These two insulators are then joined by bonding them with the splice strip 26 as is shown in FIG. 2. The bonding process is accomplished by vulcanization using an uncured rubber splice strip. Once the bonding is complete, the outer contour of the insulators 20 and 24, now joined, provides the winding surface upon which the chamber is wound.

Figure 3:
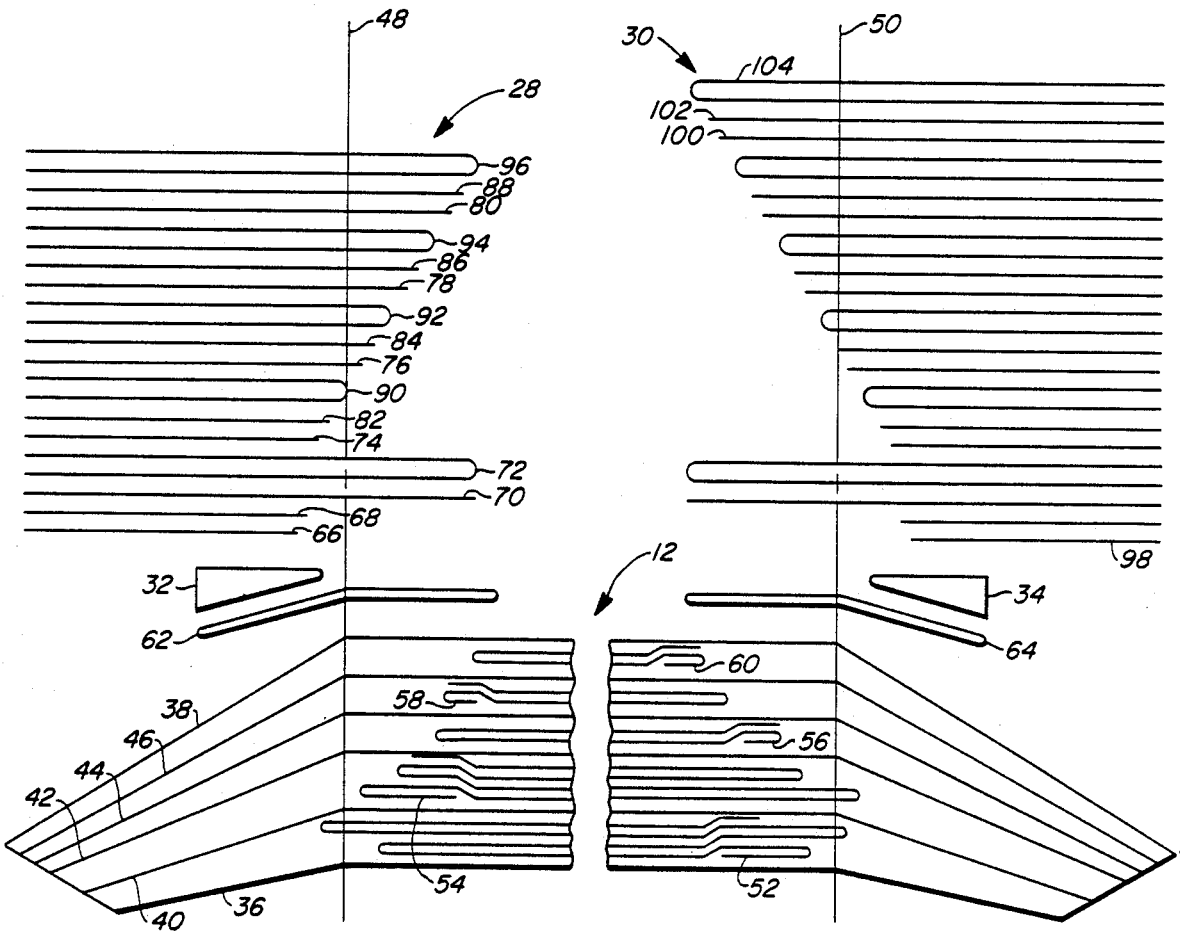
FIG. 3 is a schematic representation illustrating the winding pattern of the invention.

FIG. 3 shows the method of winding the pressure vessel 12, and subsequently the forward and aft skirts 28 and 30, respectively.

The pressure vessel 12 is wrapped with a graphite-epoxy composite material, more specifically carbon fiber which has been wet wound with an amine cured epoxy resin. The wrapping process utilizes both circular and helical patterns. The initial layer 36 which is directly adjacent to the insulators 20 and 24, is helical, as is the final layer 38. In the process of wrapping, four other layers are also of the helical configuration, namely 40, 42, 44 and 46. The angle of wrapping the helical layers varies from about 71.8 degrees at the forward end to about 71.2 degrees at the aft end. The angles, $\theta_A$ and $\theta_B$, as shown in FIG. 1, are measured from the vertical datum lines 48 and 50.

Alternating with the helical patterned layers 36, 38, 40, 42, 44 and 46 are circular patterned layers 52, 54, 56, 58 and 60. While the helical layers are made by a single pass of the material, the circular layers are made by several passes around the vessel 12, as is shown in FIG. 3. For example, circular layer 52 has approximately four passes, while circular layer 60 has about two.

Therefore, the pressure vessel 12 is formed by helical layers alternating with circular layers, the former being formed by a single pass and the latter being formed by several passes. One of the most critical considerations in achieving optimum strength is to start and end with layers of helical configuration, as is shown by layers 36 and 38.

When application of the graphite-epoxy composite material is complete, forward and aft skirt bond elastomers 62 and 64 and the forward and aft Y-joint fillers 32 and 34 are placed as shown in FIG. 3. The elastomers are preferably of a rubber such as acrylonitrile butadiene.

The forward skirt 28 and the aft skirt 30 are prepared in a manner similar to that of the pressure vessel 12 in that alternating helical and circular winding configurations are utilized.

For illustrative purposes, only the winding pattern for the forward skirt 28 is described in detail. The initial layer 66 is glass cloth. This is followed by alternating circular layers of graphite-epoxy composite material, more specifically wet wound carbon fibers, with layers of precut parallel fiber broadgoods which are preimpregnated with an epoxy resin.

Layer 66 is followed by layers 68 and 70 which are both broadgoods layers. However, while layer 68 is laid out at a 45 degree angle, layer 70 is laid out at a 0 degree angle, both angles being measured from the datum line 48. The next layer 72 is formed by making two circular passes with wet wound carbon fibers. The winding pattern of the forward skirt 28 continues in the same manner: 45 degree broadgoods layer, 0 degree broadgoods layer and circular wet wound carbon fiber layer (two passes). In that manner layers 74, 76, 78 and 80 are 45 degree broadgoods, layers 82, 84, 86 and 88 are 0 degree broadgoods and layers 90, 92, 94 and 96 are wet wound carbon fibers, with layer 96 being the final layer of the forward skirt 28.

The aft skirt 30 is prepared in a manner similar to that of the forward skirt 28. Starting with an initial layer of glass cloth 98, the same pattern of 45 degree broadgoods, 0 degree broadgoods and circular wet wound carbon fiber (two passes) is followed. The only difference between the winding pattern of the forward skirt 28 and the aft skirt 30 is that the aft skirt has an extra 45 degree layer 100, 0 degree layer 102 and final circular layer (two passes) 104, as is shown in FIG. 3.

Care is taken in laying out the skirts, that the forward skirt 28 does not extend internally beyond the aft end of the forward skirt bond elastomer 62. Likewise, the aft skirt 30 should not extend beyond the forward end of the aft skirt bond elastomer 64. The external ends of skirts 28 and 30 may be cut to size so as not to extend over the forward end of elastomer 62 and the aft end of elastomer 64.

Upon completion of wrapping the pressure vessel 12 and the skirts 28 and 30, the chamber is wrapped with a teflon coated glass cloth and then cured in a hot air oven.

This invention had been described in detail with particular reference to certain preferred embodiments thereof, but it will be understood that variations and modifications can be effected within the spirit and scope of the invention.

What is claimed is:

1. A method of manufacturing a chamber pressure vessel wherein a chamber having a forward end, an aft end, forward insulation and aft insulation, is wrapped with graphite-epoxy composite material, alternating circular and helical winding configurations, beginning and ending with said helical configuration.

2. The method of claim 1 wherein said helical winding configuration at said forward end is at an 71.8 degree angle.

3. The method of claim 1 wherein said helical winding configuration at said aft end is at an 71.2 degree angle.

* * * * *